United States Patent Office 2,825,018
Patented Feb. 25, 1958

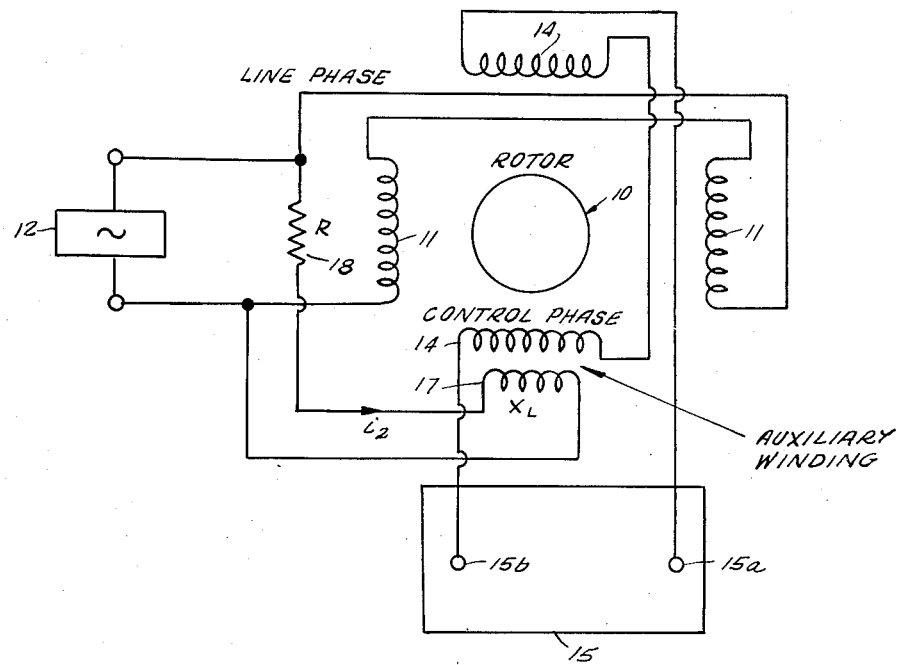

2,825,018

INDUCTIVELY OPERATED ROTARY MECHANISM

Albert Diamond, Levittown, N. Y., assignor to Kollsman Instrument Corporation, Elmhurst, N. Y., a corporation of New York Application September 1, 1954, Serial No. 453,541

11 Claims. (Cl. 318—207)

My present invention relates to motors, generators, resolvers and other inductively coupled rotary mechanisms for translating electrical energy into a mechanical component, for translating applied non-electrical energy into an electrical component and for translating electrical energy into an electrical output.

My invention has its primary application to precision servo motors, servo generators, resolvers and other apparatus, the function of which is to respond in a precise and predetermined manner to signals of specific value, range and direction. When hereinafter I shall refer to servo motors, it will be understood that the same problem and the same solution thereof will apply with equal force to generators, resolvers and other rotary inductive apparatus.

Induction motors used in servo-systems should be capable of operating in both directions with identical velocities when identical voltages of opposite phase are applied to them. This is achieved by using an induction motor having two phases of winding, one of which will be referred to as the line phase and the other one as the control phase. By the term "servo motor" I refer to its meaning accepted in the art, as an induction motor, generally precision built, designed to have a substantially linear speed (output) action proportional to the control voltage magnitude applied thereto. These are generally of the two-phase quadrature wound type.

The line phase is excited through the line voltage, and a control voltage is applied to the control phase. Depending on the phase of the voltage applied to the control phase, it becomes possible to make the induction motor rotate in either the clockwise or the counterclockwise direction.

For operation of the motor, the velocity of rotation of the servo motor preferably must be identical when voltages of identical magnitude and opposite phase are applied to the control phase, whether they cause the motor to rotate in one direction or in the opposite direction.

In this type of motor it is found that when the line phase is excited and no excitation is applied to the control winding, the servo motor has a tendency to rotate. This rotation is caused by the quadrature component of air gap flux produced by the asymmetry of the magnetic circuit. Thus when the control phase is not excited and even not present it is found that the servo motor will rotate in a preferred direction.

Furthermore, when the control phase is excited particularly at low excitation levels, the magnitudes of the velocities at which the servo motor will rotate will be different when voltages of identical magnitudes but of opposite phase are applied to the control phase winding.

The induction motor of the present invention is provided with means which prevent the rotation of the motor due to residual flux when only the line phase is excited.

Accordingly, one object of the present invention is the provision of means whereby the rotation of the servo motor due to residual flux is prevented when the line phase is excited. This novel means also serves to balance the motor speed in both directions so that it will operate with identical velocities both clockwise and counterclockwise when identical voltages in phase or in phase opposition are applied to the control winding.

Another object of the present invention is, therefore, the provision of means for balancing the speed of a servo motor in both directions of rotation, particularly at low input.

Still another object of the present invention is the provision of means for selecting the voltage at which an induction type servo motor will start and continue to run in one direction.

Since the quadrature component is at the fundamental frequency, it cannot be filtered and this limits the sensitivity of the servo generator or resolver. With my present invention, the quadrature component may be cancelled and then the harmonics filtered thereby providing a true null from which a correct and sensitively adjusted output may be obtained.

Accordingly, another object of the present invention is the provision of means for obtaining a true null in a servo generator or resolver.

In the present invention, in addition to having a line winding and a control winding as well known in the art, an auxiliary winding is added in series with a high resistance and the series combination is connected across the line winding. The magnetic axis of the auxiliary winding is positioned so as to be in quadrature with the magnetic axis of the line phase.

The principle of operation is as follows:

The series resistance of the auxiliary winding is large in comparison to the reactance of the winding so that the current flowing in the auxiliary winding is approximately 90° out of phase or better 90° leading with respect to the curent flowing in the line. Thus, the auxiliary winding introduces in the air gap of an induction motor a component quadrature flux which aids or opposes the quadrature component of the residual flux, depending upon its polarity.

Thus, the flux produced by the auxiliary winding can overcome the effects of the quadrature component of the air gap flux. This produces also balancing of the motor speed in both directions and provides a means for selecting a voltage at which the motor will start and continue to run in either one or the other direction. This starting voltage may be higher or lower than the necessary starting voltage without this novel means.

The foregoing and many other objects of the present invention will become apparent in the following description and drawings in which the figure is a schematic diagram of the induction motor of the present invention showing the novel correcting means.

Referring to the figure, the novel induction motor is provided with a rotor schematically shown at 10. The line winding 11 is connected during operation to the A. C. supply 12. The control winding 14 is connected to a second A. C. supply of variable phase and magnitude indicated at 15.

When the control supply has zero output and there is no quadrature component of air gap flux due to the residual voltage in the non-excited control winding, rotor 10 should be stationary or should have zero velocity. If supply 15 produces a given output voltage of a given polarity so as to excite the control winding 14, rotor 10 will rotate at a certain speed in one direction. When the supply 15 generates a signal of the same magnitude as the first but in the opposite direction, rotor 10 should rotate in the opposite direction but with the same speed as before.

However, this does not happen in prior induction motors of this type essentially because even when the control phase winding is not excited in any one direction, there exists a quadrature component or air gap flux and it is this component which may cause rotation of rotor 10, even when the control phase winding 14 is not excited and the unbalance of the speed of the rotor 10 is in one direction.

In the present invention, in addition to having a line and a control winding the induction motor is provided with an auxiliary winding 17 connected in series with the large resistance 18 and a series combination is connected in shunt with the line winding 11 so that when line winding 11 is excited as, for example, by main source 12 so is the auxiliary winding 17.

It should be noted further that because of the large resistance 18 in series with the auxiliary winding 17, the current $i_2$ in the auxiliary winding 17 leads the current $i_1$ of the line winding 11 by approximately 90° (if R is considerably greater than $X_L$ where $X_L$ is the reactance of the auxiliary winding 17 at the frequency of operation).

The function of this circuit is to introduce in the air gap of the motor the quadrature component of flux produced by the auxiliary winding 17 which opposes the residual quadrature flux.

Thus, the rotor 10 is prevented from rotating when only the line phase winding 11 is excited, and the speed of rotor 10 is balanced regardless of whether the voltage from supply 15 applied to the control phase winding 14 and having a given magnitude is in phase or in opposition of phase.

Furthermore, this auxiliary winding 17 permits the proper selection of the voltage from supply 15 at which rotor 10 will start and will continue to run in the desired direction.

In the above, I have specifically described my invention in connection with a servo motor. Where the invention is used in connection with a servo generator, then an output will appear across terminals 15a and 15b of member 15 which in such a case will be used as a connector, for example, an output amplifier. By the term "servo generator" I refer to an induction generator, generally of the two phase quadrature wound type and precision made, as used in servo-systems or computers. As is understood by those skilled in the art, a servo generator is the reverse use of a servo motor, giving a substantially linear output voltage (at terminals 15a, 15b) proportional to the speed motivation of its rotor. It is also known in the art as a "rate generator."

This output voltage will result because of coupling between control winding 14 and line winding 11 with the rotor M. M. F. circuit, as is well known. In such a case, auxiliary winding 17 connected in series with resistor 18 and across line winding 11 has a quadrature relation to winding 14 line voltage but in phase with the voltage produced in winding 14.

The generated quadrature component of winding 14 (i. e. with respect to the reference line voltage at 11) is the one that appears across terminals 15a and 15b. The quadrature component (also with respect to the reference line 11 voltage) of winding 17 by reason of the above mentioned connection and as shown in the figure is therefore in phase with the quadrature component of winding 14. Thus, it is directly in phase or 180° out of phase with the signal generated at winding 14. Such auxiliary signal, induced by winding 17 into winding 14, can be by predesign made to either be adjusted and used to control, buck, enhance or just cancel the quadrature component of winding 14. Therefore the output voltage appearing between terminals 15a and 15b is the "algebraic" sum of the variable voltage output generated by the rotary mechanism of the figure (when its rotor 10 is motivated), together with the predetermined voltage induced therewith through the auxiliary winding 17. Such predetermination through auxiliary winding 17 affords a (linear) resultant signal relation at output 15a, 15b that may start at "zero," or at a voltage greater or less than zero, as desired, and as will now be evident to those skilled in the art.

The same problem and the same solutions thereof as in generators applies to resolvers. It should further be noted that a servo motor through the appropriate use of the auxiliary circuit 17—18 of the present invention may be made to have increased sensitivity in one direction (unbalance) at the expense of decreased sensitivity in the opposite direction, this being made possible through the adjustment of the phase relationship between the quadrature component of control phase winding 14 and that of auxiliary winding 17. As is well known in the servo mechanism (or servo system) art, there are applications of servo motors wherein its sensitivity to "starting voltage" in one desired direction is paramount, whereas that in the opposite direction is either unused or not important.

In accordance with my invention hereinabove set forth, it will be apparent to those skilled in the art that in place of "balancing" the null M. M. F. or quadrature gap flux through the auxiliary means 17—18 described through a "bucking" action, by reversing the phase of the auxiliary winding 17 action on the gap flux therefrom an "additive" M. M. F. is accomplished "in phase" with the existing gap M. M. F. Such phasing connection of winding 17 (merely a 180° reversal of the balancing phasing described above) results in further "unbalancing" the servo motor "starting voltage" action. The result therefore is a marked increase in starting sensitivity of the servo motor when control voltage is applied thereto (at terminals 15a, 15b) in the corresponding direction (phase); and remains further decreased in sensitivity to starting up in the opposite direction of rotation. Servo motors designed herewith can be made to "start" in such predetermined direction from control voltage application (at 15a, 15b) from as low as 0.1 volt, or lower.

In the foregoing the invention has been described solely in connection with specific illustrative embodiments thereof. Since many variations and modifications of the invention will now be obvious to those skilled in the art, I prefer to be bound not by the specific disclosures herein contained but only by the appended claims.

I claim:

1. A rotary electrical device of the character described comprising a line winding connectable to a line source of alternating current of reference phase and frequency, a control winding in space quadrature with respect to said line winding connectable to a control signal of said reference frequency and in quadrature with the reference phase, a rotor magnetically relative to said windings, the speed and direction of rotation of said rotor being determined by the relative magnitude and phase of the control signal applied to said control winding, the magnetic circuit of said device having an air gap flux component in quadrature with respect to said reference phase inducing a corresponding null voltage into said control winding algebraically additive with said control signal, and electromagnetic means including an auxiliary winding inductively related to said control winding for materially changing the effect of said null voltage induced in said control winding to provide a balanced condition of starting of rotation in either direction of said rotor with respect to control signal magnitude.

2. A rotary electrical device of the character described comprising a first winding connectable to a line source of alternating current of reference phase and frequency, a second winding in space quadrature with respect to said first winding connectable to a control signal of said reference frequency, a rotor magnetically related to said windings, the speed and direction of rotation of said rotor being determined by the relative magnitude and phase of the control signal applied to said second winding, the magnetic circuit of said device having an air gap flux component in quadrature with respect to said reference phase inducing a corresponding voltage into said second winding algebraically additive with said control signal, a third winding inductively related to said second winding and in the same space phase thereto, and circuit means connected with said third winding for inducing a compensating voltage into said second winding to negative the flux induced voltage therein, said third winding and circuit means being proportioned to substantially eliminate the effect of said flux induced voltage in said second winding through a suitable compensating voltage thereby providing a balanced condition of starting of rotation in either direction of said rotor with respect to control signal magnitude.

3. A device in accordance with claim 2, in which the circuit means is connected to said first winding and includes a resistor large in relation to the reactance of said third winding at said reference frequency.

4. A device in accordance with claim 2 in which the circuit means provides a current through said third winding in phase quadrature with the current through said first winding and proportional to the line source voltage.

5. An electrical translator of the character described comprising a line winding connectable to a line source of alternating current of reference phase and frequency, a control winding in space quadrature with respect to said line winding, a rotor magnetically related to said windings, the magnetic circuit of said translator having an air gap flux component in quadrature with respect to said reference phase inducing a corresponding null voltage into said control winding, and electromagnetic means including an auxiliary winding associated with said control winding for substantially eliminating said null voltage induced therein.

6. A rotary electrical translator of the character described comprising a first winding connectable to a line source of alternating current of reference phase and frequency, a second winding in space quadrature with respect to said first winding, a rotor magnetically related to said windings, the magnetic circuit of said translator having an air gap flux component in quadrature with respect to said reference phase inducing a corresponding voltage into said second winding, rotation of said rotor producing a signal at said second winding of said reference frequency and in quadrature with the reference phase, and electromagnetic means associated with said second winding for substantially compensating for said voltage induced in said second winding including a third winding inductively related to said second winding and in the same space phase thereto for predetermining the relative signals produced by said second winding resultant for either direction of rotor rotation.

7. A rotary electrical device of the character described comprising a first winding connectable to a line source of alternating current of reference phase and frequency, a second winding in space quadrature with respect to said first winding, a rotor magnetically related to said windings, the magnetic circuit of said device having an air gap flux component in quadrature with respect to said reference phase inducing a corresponding null voltage into said second winding, rotation of said rotor producing a signal in said second winding of said reference frequency and in quadrature with the reference phase, a third winding inductively related to said second winding and in the same space phase thereto, and circuit means connected to said first winding for providing a current through said third winding in phase quadrature with the current through said first winding and proportional to the line source voltage, thereby inducing a second voltage into said second winding algebraically additive to the flux induced null voltage therein, said third winding and circuit means being proportioned to substantially change the effect of said flux induced voltage in said second winding by said second voltage for predetermining the relative signals produced by said second winding resultant for either direction of rotor rotation.

8. A device as defined in claim 7, in which the circuit means is connected to said first winding and includes a resistor large in relation to the reactance of said third winding at said reference frequency.

9. A device as defined in claim 7, in which the circuit means provides a current through said third winding in phase quadrature with the current through said first winding and proportional to the line source voltage.

10. A rotary electrical device of the character described comprising a line winding connectable to a line source of alternating current of reference phase and frequency, a control winding in space quadrature with respect to said line winding connectable to a control signal of said reference frequency and in quadrature with the reference phase, a rotor magnetically relative to said windings, the speed and direction of rotation of said rotor being determined by the relative magnitude and phase of the control signal applied to said control winding, the magnetic circuit of said device having an air gap flux component in quadrature with respect to said reference phase inducing a corresponding null voltage into said control winding algebraically additive with said control signal, and electromagnetic means associated with said control winding including a second voltage therein in phase with the said null voltage, thereby substantially enhancing the sensitivity to rotation starting of said rotor in the corresponding direction.

11. A device as defined in claim 10, in which the electromagnetic means includes a third winding and circuit means related to the line winding.

References Cited in the file of this patent

UNITED STATES PATENTS

| 2,489,689 | Wald | Nov. 29, 1949 |
| 2,610,312 | Seay | Sept. 9, 1952 |
| 2,671,876 | Spielberg | Mar. 9, 1954 |
| 2,745,288 | Konet et al. | May 15, 1956 |

FOREIGN PATENTS

| 703,329 | Great Britain | Feb. 3, 1954 |